(No Model.)
M. CAMPBELL.
BALE TIE.
No. 263,677. Patented Sept. 5, 1882.
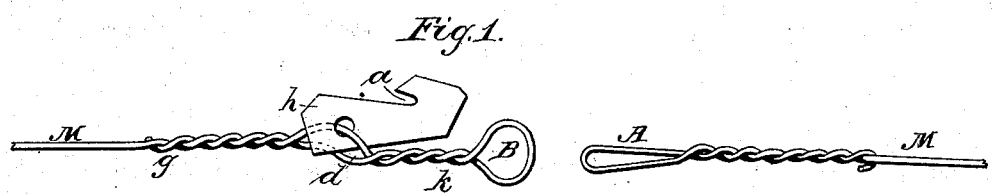
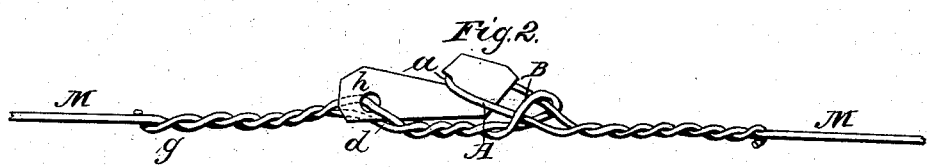
Witnesses.
John M. Brown.
Schuyler Carskadden
Inventor.
Marvin Campbell

UNITED STATES PATENT OFFICE.

MARVIN CAMPBELL, OF SOUTH BEND, INDIANA.

BALE-TIE.

SPECIFICATION forming part of Letters Patent No. 263,677, dated September 5, 1882.

Application filed May 6, 1882. (No model.)

*To all whom it may concern:*

Be it known that I, MARVIN CAMPBELL, of the city of South Bend and county of St. Joseph, and State of Indiana, have invented certain new and useful Improvements in Bale-Ties; and I do hereby declare that the following is a full and clear description of the manner in which I make and use my improved bale-tie, whereby those skilled in the art to which my invention belongs may be enabled to make and use the same, reference being had to the accompanying drawings, forming a part of this specification.

Similar letters of reference indicate like parts in each of the figures.

My improvement relates to the manner in which I form and prepare the two ends of a wire bale-tie, and afterward the manner in which I fasten or lock them together. Hence in my drawings I only show the two ends of the bale-tie, as I consider that to be sufficient to illustrate my invention.

I form one end of the wire or analogous bale material into a loop of moderate length, as shown at A in Figure 1. The other end I turn back upon itself, and make the short twist $d$ $k$, thus forming the loop B. I then suspend a hook, $h$, upon the wire bent back, and continue the twist from $d$ to $g$, thus securing the hook at the point $d$. I prefer to make the hook $h$ of sheet metal, as shown in the drawings, but it may be made of any suitable material. To lock the two ends together I pass the loop A through the loop B, and then over the loose end of the hook $h$, when it will be securely locked, as shown in Fig. 2, the loop A resting on the hook $h$ and drawn into the notch $a$. In this position the tension caused by expansion of the bale will make the loop B hold the loop A firmly upon the hook $h$ and in the notch $a$, from which it cannot be released except by reversing the operation which was undergone in placing it there.

In the drawings I show the band made of wire. It may be made of hoop-iron, sheet metal, or any suitable material. I show the hook $h$ with its open side turned up away from the band. It may have the open side of the hook turned down toward the band. Where a wire hook is used it probably will be preferred to turn the open side of the hook toward the band, as it will then rest against the band and thus be strengthened.

What I claim is—

1. A bale-tie, one end having a hook situated back of a loop, the open side of the hook turned away from or toward the band, substantially as described, and for the purpose set forth.

2. The combination, in a bale-tie, of the hook $h$, loop B, and loop A, substantially as herein described.

In testimony whereof I have hereunto set my hand in the presence of two witnesses.

MARVIN CAMPBELL.

Witnesses:
JOHN M. BROWN,
WM. T. CARSKADDEN.